United States Patent
Servesko et al.

(10) Patent No.: US 10,113,128 B2
(45) Date of Patent: Oct. 30, 2018

(54) FLUORINE-CONTAINING AGENTS FOR ENHANCING HYDRATE INHIBITORS

(71) Applicant: Ecolab USA Inc., St. Paul, MN (US)

(72) Inventors: Jeff Servesko, Sugar Land, TX (US);
Rebecca Michele Lucente-Schultz, Missouri City, TX (US)

(73) Assignee: Ecolab USA Inc., St. Paul, MN (US)

( * ) Notice: Subject to any disclaimer, the term of this patent is extended or adjusted under 35 U.S.C. 154(b) by 107 days.

(21) Appl. No.: 15/087,237

(22) Filed: Mar. 31, 2016

(65) Prior Publication Data

US 2016/0289581 A1    Oct. 6, 2016

Related U.S. Application Data

(60) Provisional application No. 62/141,547, filed on Apr. 1, 2015.

(51) Int. Cl.
| | | |
|---|---|---|
| *C09K 8/035* | (2006.01) | |
| *C10L 3/10* | (2006.01) | |
| *C10L 3/00* | (2006.01) | |
| *F16L 58/00* | (2006.01) | |

(52) U.S. Cl.
CPC .............. *C10L 3/107* (2013.01); *C10L 3/003* (2013.01); *C10L 2200/025* (2013.01); *C10L 2200/029* (2013.01); *C10L 2200/0254* (2013.01); *C10L 2200/0259* (2013.01); *C10L 2200/0263* (2013.01); *C10L 2200/0268* (2013.01); *C10L 2230/08* (2013.01); *F16L 58/00* (2013.01)

(58) Field of Classification Search
CPC .. C09K 2208/32; C09K 2208/22; C09K 8/74; C09K 8/035; C09K 8/54; C09K 8/68; C09K 8/72; C09K 8/62; C09K 8/52; C09K 8/70; C09K 8/56; C09K 8/80; C09K 8/92; C09K 8/032; C09K 8/516; C09K 8/536; C09K 8/58; C09K 8/64; C09K 3/18; C09K 8/40; C09K 8/66; C09K 8/725; C09K 8/76; C09K 8/82; C09K 8/86; C09K 8/88; C09K 8/90; C09K 8/06; C09K 8/12; C09K 8/34; C09K 8/36; C09K 8/46; C09K 8/60; E21B 41/02; E21B 37/06; E21B 21/003; E21B 21/062; E21B 43/16; E21B 43/088; E21B 43/34; E21B 21/06; E21B 21/063; E21B 21/068

See application file for complete search history.

(56) References Cited

U.S. PATENT DOCUMENTS

| | | |
|---|---|---|
| 4,022,606 A | 5/1977 | Conrad et al. |
| 6,556,309 B1 | 4/2003 | Campbell et al. |
| 7,264,653 B2 | 9/2007 | Panchalingam et al. |
| 7,381,689 B2 | 6/2008 | Panchalingam et al. |
| 8,618,025 B2 | 12/2013 | Webber |
| 2005/0081432 A1* | 4/2005 | Panchalingam ......... C09K 8/52 44/419 |
| 2012/0078021 A1* | 3/2012 | Durham ................... C07C 7/20 585/4 |
| 2012/0157351 A1* | 6/2012 | Webber .................... C09K 8/52 507/90 |
| 2012/0161070 A1 | 6/2012 | Webber et al. |
| 2014/0066683 A1* | 3/2014 | O'Rear ................... C07C 7/152 585/818 |
| 2016/0122619 A1 | 5/2016 | Lucente-Schultz et al. |

FOREIGN PATENT DOCUMENTS

| | | |
|---|---|---|
| GB | 2349889 A | 11/2000 |
| JP | 2013-28672 A | 2/2013 |
| WO | 2010/045523 A1 | 4/2010 |
| WO | WO2010/045523 * | 4/2010 |
| WO | 2013/032756 A1 | 3/2013 |
| WO | 2013089802 A1 | 6/2013 |
| WO | WO2013/089802 * | 6/2013 |

OTHER PUBLICATIONS

M.F. Mady et. al. The first kinetic hydrate inhibition investigation on fluorinated polymers: Poly(fluoro-alkylacrylamide)s, Chemical Engineering Science, 119 (2014), 230-235.*
International Search Report and Written Opinion dated Jul. 17, 2016 relating to PCT Application No. PCT/US2016/025257, 16 pages.
Kelland, M. A., et al., "Studies on Some Alkylamide Surfactant Gas Hydrate Anti-Agglomerants," Chemical Engineering Science, 2006, pp. 4290-4298, vol. 61.
Mady, Mohamed F. et al., The first kinetic hydrate inhibition investigation on fluorinated polymers: Poly (fluoroalkylacrylamide)s, Chemical Engineering Science 119 (2014), pp. 230-235.
Murshed, M. Mangir et al., The role of hydrochlorofluorocarbon densifiers in the formation of clathrate hydrates in deep boreholes and subglacial environments, Annals of Glaciology 47 (2007) pp. 109-114.
Yoslim, Jeffry et al., Enhanced growth of methane-propane clathrate hydrate crystals with sodium dodecyl sulfate, sodium tetradecyl sulfate, and sodium hexadecyl sulfate surfactants, Journal of Crystal Growth 313 (2010) pp. 68-80.
Karaaslan, Ugur et al., Effect of Surfactants on Hydrate Formation Rate, Annals of the New York Academy of Sciences, 2000, 912 (gas hydrates), pp. 735-743.

* cited by examiner

*Primary Examiner* — Kumar R Bhushan
(74) *Attorney, Agent, or Firm* — Senniger Powers LLP

(57) ABSTRACT

The present invention generally relates to one or more compositions and methods for inhibiting the formation of gas hydrate agglomerates in a fluid using a fluorine-containing agent and an anti-agglomerant. The fluid may be contained, for example, in an oil or gas pipeline or refinery.

19 Claims, No Drawings

FLUORINE-CONTAINING AGENTS FOR ENHANCING HYDRATE INHIBITORS

CROSS-REFERENCE TO RELATED APPLICATION

This application claims priority to U.S. Provisional Patent Application Ser. No. 62/141,547 filed on Apr. 1, 2015, the disclosure of which is incorporated herein by reference in its entirety.

FIELD OF THE INVENTION

The present invention generally relates to one or more compositions and methods for inhibiting the formation of gas hydrate agglomerates in a fluid using a fluorine-containing agent and an anti-agglomerant. The fluid may be contained, for example, in an oil or gas pipeline or refinery.

BACKGROUND OF THE INVENTION

Natural gas hydrates are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure. In 1934, Hammerschmidt determined that natural gas hydrates were blocking gas transmission lines, frequently at temperatures above the ice point. This discovery caused a more pragmatic interest in gas hydrates and led to the regulation of the water content in natural gas pipelines.

Gas hydrates can be easily formed during the transportation of oil and gas in pipelines under certain conditions. Factors affecting gas hydrate formation include gas composition, water content, temperature and pressure, particularly low temperature and high pressure. While these crystalline cage-like structures are small initially, they are able to agglomerate into solid masses called gas hydrate plugs. The formation of gas hydrates within a pipeline often results in lost oil or gas production, damage to transmission lines and equipment, and safety hazards to field workers.

Three types of hydrate inhibitors are currently available to the energy industry for controlling gas hydrates: thermodynamic hydrate inhibitors (THIs), kinetic hydrate inhibitors (KHIs), and anti-agglomerants (AAs). Thermodynamic inhibitors are substances that can reduce the temperature at which gas hydrates form at a given pressure and water content. Methanol and ethylene glycol are among the most common thermodynamic inhibitors used in the oil industry. However, thermodynamic inhibitors often have to be added in large amounts to be effective, typically in the order of several tens of percent by weight of the water present. Therefore, there is a substantial cost associated with transportation and storage of large quantities of THIs.

A more cost-effective alternative is the use of kinetic hydrate inhibitors and anti-agglomerants, which are known collectively as low-dosage hydrate inhibitors (LDHIs), reflecting the much lower dosage requirements compared with THIs. Typically, KHIs are low molecular weight polymers that adsorb on gas hydrate crystal faces and interfere with the nucleation and growth of gas hydrate crystals. Unfortunately, there are several limitations that have been discovered with the use of KHIs such as subcooling limits, solubility problems based on temperature and salt content of the water, chemical incompatibility with the system being treated, and expense of the polymers used.

Anti-agglomerants are an alternative to THIs and KHIs. Anti-agglomerants are surface active molecules that attach to and disperse fine gas hydrate crystals, preventing their agglomeration and growth into masses that could become plugs. When small gas hydrate crystals begin to form, AAs attach to them to make the surface hydrophobic, which mediates the capillary attraction between the crystals and water and disperses the crystals into the hydrocarbon phase. This results in a transportable slurry that can flow to the processing facility.

AAs are a cost effective alternative to THIs and are not generally sensitive to changes in system subcooling like KHIs. However, since AAs require a hydrocarbon phase to disperse the gas hydrate crystals, they typically have a water-cut limitation. In general, the water-cut should be below 50% because otherwise the slurry becomes too viscous to transport.

Accordingly, there is an ongoing need for compositions and methods that effectively prevent agglomeration of gas hydrates in oil and gas transportation and handling processes, particularly at water-cuts greater than 50%.

SUMMARY OF THE INVENTION

One aspect of the invention is a method for inhibiting gas hydrate agglomeration in a fluid comprising a hydrocarbon and water. The method comprises adding to the fluid an effective amount of a gas hydrate-inhibiting composition comprising an anti-agglomerant agent and a fluorine-containing agent, the gas hydrate-inhibiting composition inhibits gas hydrate agglomeration in the fluid.

Another aspect of the invention is a gas hydrate-inhibiting composition for inhibiting gas hydrate formation in a hydrocarbon fluid, the composition comprising: about 1-80 wt. % of an anti-agglomerant agent; a fluorine-containing agent; and a solvent.

Yet another aspect is a method for inhibiting gas hydrate formation in a fluid comprising a hydrocarbon and water. The method comprises adding to the fluid an effective amount of a gas hydrate-inhibiting composition comprising a low dose hydrate inhibitor and a fluorine-containing agent, wherein the fluorine-containing agent comprises a fluoroalkyl moiety. The gas hydrate-inhibiting composition inhibits gas hydrate formation in the fluid.

Other objects and features will be in part apparent and in part pointed out hereinafter.

DETAILED DESCRIPTION OF THE INVENTION

Compositions and methods for inhibiting gas hydrate formation or agglomeration are provided to effectively control gas hydrate formation and plugging in hydrocarbon production and transportation systems. The methods may be applied to prevent, reduce or mitigate plugging of conduits, pipes, transfer lines, valves, and other places or equipment where gas hydrates or gas hydrate agglomerates can form.

A gas hydrate-inhibiting composition for inhibiting gas hydrate formation in a hydrocarbon fluid, the composition comprising: about 1-80 wt. % of an anti-agglomerant agent; a fluorine-containing agent; and a solvent.

The gas hydrate-inhibiting compositions useful in the compositions and methods contain an effective amount of a fluorine-containing agent and a low dose hydrate inhibitor, preferably, the low dose hydrate inhibitor comprises an anti-agglomerant agent to inhibit gas hydrate formation or agglomeration in the fluid.

The fluorine-containing agent can comprise a fluoro compound, a fluoride ion, or a fluoro acid.

The fluoro compound can comprise a fluoroalkyl moiety.

The fluorine-containing agent can be a perfluoropolyether, a perfluroalkylether, a perfluoropolyalkylether, a partially fluorinated betaine, a partially fluorinated amine oxide, a partially fluorinated non-ionic surfactant, a perfluroalkane, a partially fluorinated polybutylene, a tetraalkylammonium fluoride, sodium fluoride, hydrofluoric acid, or a combination thereof.

The fluorine-containing agent can be a compound of formula 1 having the structure of:

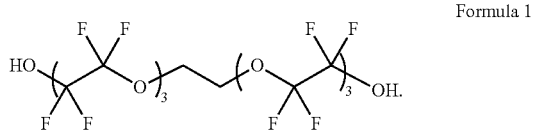

Formula 1

The fluorine-containing agent can be a compound of formula 2 having the structure of:

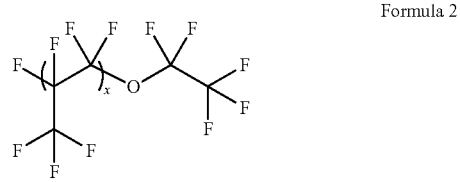

Formula 2 wherein x is an integer from 10 to 60.

The fluorine-containing agent can be a compound of formula 3 having the structure of:

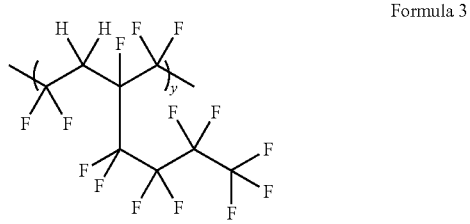

Formula 3 wherein y is an integer from 1 to 275.

The fluorine-containing agent can be a compound of formula 4 having the structure of:

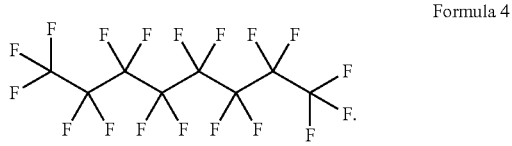 [SMILES: FC(F)(F)C(F)(F)C(F)(F)C(F)(F)C(F)(F)C(F)(F)C(F)(F)C(F)(F)F]

Formula 4

The compounds of Formulae 1, 2, 3, and 4 are commercially available from DuPont, Wilmington, Del.

The low dose hydrate inhibitor can be a kinetic hydrate inhibitor (KHI). The KHI can be a polyvinyylcaprolactam (PVCap), a polyvinylpyrrolidone (PVP), a poly(VCap-co-VP), a polyisopropylmethacrylamide (PIPMA), a poly(IPMA-co-MAPTAC), a polymer or copolymer of VP and/or VCap with 2-acrylamido-2-methylpropane sulfonic acid (AMPS), a polymer or copolymer of vinyl alcohol with VCap and/or VP, a dendritic or hyperbranched KHI, a copolymer of an acrylamide or an acrylate with VP and/or VCap, a polymer or a copolymer of maleic anhydride reacted with amines, a polymer of polyoxyalkylenediamine or polyoxyaryolenediamine or a copolymer thereof, a polymers or copolymer of maleimide, a polymer or copolymer of N-methyl-N-vinylacetamide (VIMA) or N-vinylformamide, a cyclic imino ether polymer or copolymer, a copolymer of VCap and/or VP with a vinyl acid monomer, a diallylamide polymer or copolymer, a polyaspartic acid, or a combination thereof.

The anti-agglomerant agent (AA) can be an oxazolidinium compound; a quaternary ammonium compound with alkyl groups, alkoxylated alkyl groups, and fatty ester groups; tetrapropylene succinic acid-N,N-dibutylamino-N-ethyl ester; a quaternary ammonium compound with alkyl groups having alkoxy, amide, and ester substitution; a quaternary alkyl ammonium compounds; a quaternary ammonium, a quaternary phosphonium, a betaine, an amide, an amino alcohol, an ester, a sulphonium salt, or an amine oxide; an onium compound and amine salt; an amine compound having ether linkages; an alkoxylated diamine; an amine oxide salt; a zwitterionic quaternary ammonium compound; an ammonium or phosphonium alkylated hydrate; an alkylated ammonium, phosphonium, or sulphonium compound; a water-soluble alkoxide-based polymer or copolymer; an amino acid; a nonionic or anionic amphiphilic compound containing a polyol and a substituted or unsubstituted carboxylic acid; a hydroxycarbylamide; an organic amine and organic acid salt; a piperazine derivative; a quaternary ammonium substituted with an alkoxy group; an ion-pair amphiphilic complex; a rhamnolipid biosurfactant; a citric acid ester or citramide derivative; a quaternary amine having an amide group; a quaternary amine having an ester group; an ester quaternary ammonium compound; a reaction product of a polymerized unsaturated oil and an amino alcohol; an alkyl quaternary ammonium or phosphonium having alkoxylation; a quaternary sulphonium, phosphonium, ammonium salt combined with a corrosion inhibitor; an alkyl glycoside; an alkyl aryl sulphonic acid or an alkali metal or ammonium salt; a pyroglutamic acid ester; a tertiary amine salt; a quaternary ammonium polyoxyalkylene ester; a reaction product of a non-halide-containing inorganic acid, organic acid, or organic amine; a quaternary benzylammonium ion; a quaternary alkylammonium ion; a piperazinium amide/ester surfactant; an ammonium amide/ester surfactant; a cyclic ammonium amide/ester surfactant; or a combination thereof.

The AA can be a quaternary benzylammonium ion, a quaternary alkylammonium ion, piperazinium amide/ester surfactant, an ammonium amide/ester surfactant, a cyclic ammonium amide/ester surfactant, or a combination thereof.

Preferably, the AA can be an ammonium amide/ester surfactant, a cyclic ammonium amide/ester surfactant, or a combination thereof.

The effective amount of the fluorine-containing agent can be from about 0.1 to about 2 wt. %, from about 0.1 to about 1.8 wt. %, from about 0.1 to about 1.6 wt. %, from about 0.1 to about 1.5 wt. %, from about 0.2 to about 2 wt. %, from about 0.2 to about 1.8 wt. %, from about 0.2 to about 1.6 wt. %, from about 0.2 to about 1.5 wt. %, from about 0.3 to about 2 wt. %, from about 0.3 to about 1.8 wt. %, from about 0.3 to about 1.6 wt. %, from about 0.3 to about 1.5 wt. %, from about 0.4 to about 2 wt. %, from about 0.4 to about 1.8 wt. %, from about 0.4 to about 1.6 wt. %, from about 0.4 to about 1.5 wt. %, from about 0.5 to about 2 wt. %, from about 0.5 to about 1.8 wt. %, from about 0.5 to about 1.6 wt. %, from about 0.5 to about 1.5 wt. %, based on the total weight of the produced water in the well system. Preferably, the effective amount of the fluorine-containing agent is from about 0.5 to about 1.5 wt. %.

There are a number of factors that must be taken into account in determining the effective amount of an anti-agglomerant or a fluorine-containing agent, including, but not necessarily limited to, the proportion of water in the fluid, the nature of the hydrocarbon, the nature of the hydrate-forming guest molecules, the temperature and pressure conditions that the mixture of hydrocarbon and water are subject to, the particular compound employed, etc. Routine experimentation with a particular set of conditions and/or in a specific system can determine the optimum dosage range to avoid the formation of problematic quantities of irreversible, harmful gas hydrate masses.

The gas hydrate-inhibiting composition for inhibiting gas hydrate formation in a hydrocarbon fluid, can comprise from about 1 to about 80 wt. %, from about 1 to about 75 wt. %, from about 1 to about 70 wt. %, from about 1 to about 65 wt. %, from about 1 to about 60 wt. %, from about 1 to about 55 wt. %, from about 1 to about 50 wt. %, from about 5 to about 80 wt. %, from about 5 to about 75 wt. %, from about 5 to about 70 wt. %, from about 5 to about 65 wt. %, from about 5 to about 60 wt. %, from about 5 to about 55 wt. %, from about 5 to about 50 wt. %, from about 10 to about 80 wt. %, from about 10 to about 75 wt. %, from about 10 to about 70 wt. %, from about 10 to about 65 wt. %, from about 10 to about 60 wt. %, from about 10 to about 55 wt. %, from about 10 to about 50 wt. %, of an anti-agglomerant agent.

The methods of the present invention involve contacting a hydrocarbon and water mixture with a suitable gas hydrate-inhibiting composition. When an effective amount of the gas hydrate-inhibiting composition is used, gas hydrate blockage is inhibited. In the absence of such an effective amount, gas hydrate blockage is not inhibited.

The contacting may be achieved in a number of ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the gas hydrate-inhibiting composition into the mixture. The contacting can be made in-line and/or offline. The various components of the composition may be mixed prior to and/or during contact. If needed or desired, the composition or some of its components may be optionally removed or separated mechanically, chemically, or by other methods known to one skilled in the art, or by a combination of these methods after the gas hydrate formation conditions are no longer present.

When considering the appropriate dose or whether additional doses of the gas hydrate-inhibiting composition are needed, the temperature, pressure, brine composition, brine volume, oil composition, oil volume, and gas composition are considered for a particular system to determine the effective amount of gas hydrate-inhibiting composition to inhibit gas hydrate formation or agglomeration under the conditions present for the particular system to be treated.

The gas hydrate-inhibiting composition is added into the mixture of hydrocarbons and water at any concentration effective to inhibit the formation of gas hydrates or gas hydrate agglomerates under the given conditions. Accordingly, the effective amount of the composition can range from about 0.1 volume percent to about 10 volume percent, from about 0.1 volume percent to about 9 volume percent, from about 0.1 volume percent to about 8 volume percent, from about 0.1 volume percent to about 7 volume percent, from about 0.1 volume percent to about 6 volume percent, from about 0.1 volume percent to about 5 volume percent, from about 0.3 volume percent to about 10 volume percent, from about 0.3 volume percent to about 9 volume percent, from about 0.3 volume percent to about 8 volume percent, from about 0.3 volume percent to about 7 volume percent, from about 0.3 volume percent to about 6 volume percent, from about 0.3 volume percent to about 5 volume percent, from about 0.5 volume percent to about 10 volume percent, from about 0.5 volume percent to about 9 volume percent, from about 0.5 volume percent to about 8 volume percent, from about 0.5 volume percent to about 7 volume percent, from about 0.5 volume percent to about 6 volume percent, from about 0.5 volume percent to about 5 volume percent, based on the amount of produced water in the well system. Preferably, the effective amount of the composition can range from about 0.1 volume percent to about 5 volume percent. The effective amount of the composition can also range from about 0.5 volume percent to about 5 volume percent.

Typically, the amount of produced water is based on the amount of produced water per day that is calculated from the average volume of production per day for a particular well. The effective amount of the gas hydrate-inhibiting composition can be provided to the system in one or more doses.

The gas hydrate-inhibiting composition can also have particular properties for advantageous use in a well, transport, or other system. For example, the composition can have a viscosity of less than 250 cP, less than 200 cP, less than 150 cP, or preferably, less than 100 cP, to provide a composition that can be easily pumped throughout a system.

The gas hydrate-inhibiting compositions are chemically compatible with various elastomers and metals. Elastomers screened or compatibility can include Neoprene (i.e., polychloroprene), Hypalon® (chlorosulfonated polyethylene synthetic rubber), nitrile butadiene rubber (NBR), ethylene propylene rubber (EPR), Teflon® (polytetrafluoroethylene), Kalrez® (perfluoro hydrocarbon elastomer), high density polyethylene (HDPE), Nylon 11 (polyamide bioplastic), polyether ether keton (PEEK), ethylene propylene diene rubber (EPDM White), hydrogenated nitrile butadiene rubber (HNBR), Viton® A (perfluoro hydrocarbon elastomer), Viton® B (perfluoro hydrocarbon elastomer), and Chemraz® (perfluoro hydrocarbon elastomer). Metals screened for compatibility can include AISI 1018 carbon steel, Inconel® 625 nickel-chromium alloy, SS2507 stainless steel, copper, SS2205 stainless steel, Hastelloy C-276® (nickel-molybdenum-chromium alloy), SS304L stainless steel, and SS316L stainless steel. The elastomers and metals are screened for compatibility at the effective amount used in the system as described above. The compositions are chemically compatible with metals when they do not cause corrosion to occur to the stainless steel and mild carbon steel components of the system and are chemically compatible with elastomers when they do not cause mass change or swelling.

Also, the compositions preferably do not interfere or react with any corrosion inhibitor, scale inhibitor, or other production chemical additives that are used in the system.

Advantageously, the gas hydrate-inhibiting compositions do not form emulsions or foams when stored or upon use in a system. Emulsion formation can cause water quality issues in disposal of the produced water and foaming of the produced liquid can cause handling and system upset problems.

The gas hydrate-inhibiting compositions can also reduce friction or drag when fluids are transported. Thus, these compositions can act as drag reducers or friction reducers when added to the hydrocarbon fluids.

The methods are useful for inhibiting hydrate formation or agglomeration for many hydrocarbons and hydrocarbon mixtures. The methods are particularly useful for lighter or low-boiling, $C_1$-$C_5$ hydrocarbon gases or gas mixtures at ambient conditions. Non-limiting example of such gases include methane, ethane, propane, n-butane, isobutane, isopentane and mixtures thereof. Other examples include various natural gas mixtures that are present in many gas and/or oil formations and natural gas liquids. The hydrates of all these low-boiling hydrocarbons are also referred to as gas hydrates. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

The methods can be used at any pressure that allows formation of hydrocarbon gas hydrates. When the hydrocarbons in the mixture are lower boiling hydrocarbons or hydrocarbon gases at ambient conditions, the pressure is usually at or greater than atmospheric pressure (i.e. about 101 kPa), preferably greater than about 1 MPa, greater than about 2 MPa, greater than about 3 MPa, greater than about 4 MPa, and more preferably greater than about 5 MPa. The pressure in certain formation or processing units or plants could be much higher, such as greater than about 20 MPa. There is no specific high-pressure limit.

The temperature for contacting the mixture with the gas hydrate-inhibiting composition is usually approximately at or below ambient or room temperature. Lower temperatures tend to favor gas hydrate formation. At much higher temperatures, gas hydrates are less likely to form.

In addition to the fluorine-containing agent and low dose hydrate inhibitor, the composition may also include liquids. These liquids are generally solvents for the solid form of the agents. Representative polar solvents suitable for formulation with the composition include water, brine, seawater, alcohols (including straight chain or branched aliphatic alcohols such as methanol, ethanol, 2-ethoxyethanol, propanol, isopropanol, butanol, isobutanol, hexanol, 2-ethylhexanol, octanol, or decanol), glycols and glycol ether derivatives (e.g. ethylene glycol, 1,2-propylene glycol, 1,3-propylene glycol, hexylene glycol, ethylene glycol monobutyl ether, ethylene glycol dibutyl ether, or diethylene glycol monomethyl ether), ethers (e.g., tetrahydrofuran), ketones (e.g. methyl ethyl ketone, cyclohexanone, or diisobutyl ketone), amides (e.g., N-methyl-2-pyrrolidinone or N,N-dimethylformamide), aromatic (xylene, toluene, heavy aromatic naphtha (HAN)), aliphatic (limonene), or a combination thereof.

Representative nonpolar solvents suitable for formulation with the composition include aliphatic hydrocarbons such as pentane, hexane, cyclohexane, methylcyclohexane, heptane, decane, dodecane, limonene, or diesel; aromatic hydrocarbons such as toluene, xylene, heavy aromatic naphtha, fatty acids or a derivative thereof (e.g., an amide, an ester, or a combination of amide and ester derivatives), or a combination thereof.

The gas hydrate-inhibiting composition can further comprise an acid. The acid can comprise acetic acid, acrylic acid, phospohorous acid, nitric acid, sulfuric acid, maleic acid, dodecylbenzenesulfonic acid (DDBSA), an alkanoic acid (e.g., propanoic, butanoic, ethanoic), or a combination thereof.

The selection of a suitable solvent or combination of solvents provides a stable composition during storage and stability and reduced viscosity for the composition when injected against a pressure of 1.3 MPa to 172 MPa. The solvent is present in the composition in the range from about 1 to about 99 wt. %, from about 5 to about 99 wt. %, from about 10 to about 99 wt. %, from about 15 to about 99 wt. %, and more preferably from about 20 to about 99 wt. % of the total composition based on the weight of the total composition.

The compositions can include other means of gas hydrate inhibition, such as thermodynamic hydrate inhibitors and kinetic hydrate inhibitors. If mixtures of gas hydrate inhibitors are used, the mixture can be added to the hydrocarbon and water mixture through a single port or multiple ports. Alternatively, individual gas hydrate inhibitors can be added to separate ports to access the hydrocarbon mixture.

The composition can include other oil field flow assurance components including, but not limited to, a corrosion inhibitor, a scale inhibitor, a paraffin inhibitor, an asphaltene inhibitor, an emulsion breaker, a water clarifier, or a combination thereof.

The particular formulation of the composition depends upon the application of the composition and any additional treatments that will be used in conjunction with the gas hydrate-inhibiting composition. For example, if the composition will be injected with a paraffin inhibitor that is typically only formulated in nonpolar solvents, then solvents such as diesel, heavy aromatic naphtha, fatty acid methyl esters, xylene, or toluene, may be used. The composition can also be formulated in a nonpolar solvent to minimize the risk of incompatibility between the AA compound and the other oil field flow assurance components.

Alternatively, if the composition will be injected with a water soluble corrosion inhibitor or scale inhibitor, a polar solvent such as methanol, ethanol, isopropanol, 2-butoxyethanol, ethylene glycol, propylene glycol, or a combination thereof, can be used.

The methods can further comprise treating the fluid with one or more gas hydrate inhibitors in addition to the gas hydrate-inhibiting composition. A thermodynamic hydrate inhibitor and/or kinetic hydrate inhibitor can be formulated with the gas hydrate-inhibiting composition or added to the fluid separately. Individual inhibitors can also be added to the fluid at separate ports. The effective amount of thermodynamic hydrate inhibitor and/or kinetic hydrate inhibitor can be empirically determined based on the characteristics of the fluid being treated, for example, using the rocking cell test described herein.

To ensure effective inhibition of formation or agglomeration of gas hydrates, the gas hydrate-inhibiting composition should be injected prior to formation of gas hydrates or gas hydrate agglomerates. The composition can be injected at the wellhead, at subsea, in a riser, or a flow line. Typically, the gas hydrate-inhibiting composition is injected at the wellhead or below the wellhead. The treatment can also be used for pipelines or anywhere in the system where there is a potential for gas hydrate formation.

The composition is introduced into the fluid by any means suitable for ensuring dispersal of the gas hydrate-inhibiting composition through the fluid being treated. Typically the gas hydrate-inhibiting composition is injected using mechanical equipment such as chemical injection pumps, piping tees, injection fittings, and the like. The gas hydrate-inhibiting composition can be injected as prepared or formulated in an additional polar or nonpolar solvent as described herein depending on the application and requirements. The gas hydrate-inhibiting compositions can be pumped into the oil/gas pipeline by using an umbilical line. Also, capillary injection systems can be used to deliver the gas hydrate-inhibiting compositions. U.S. Pat. No. 7,311,144 provides a description of an apparatus and methods relating to capillary injection, which is herein incorporated by reference.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The terms "halogen" or "halo" as used herein alone or as part of another group refer to chlorine, bromine, fluorine, and iodine.

The term "-ene" as used as a suffix as part of another group denotes a bivalent substituent in which a hydrogen atom is removed from each of two terminal carbons of the group, or if the group is cyclic, from each of two different carbon atoms in the ring. For example, alkylene denotes a bivalent alkyl group such as methylene (—$CH_2$—) or ethylene (—$CH_2CH_2$—), and arylene denotes a bivalent aryl group such as o-phenylene, m-phenylene, or p-phenylene.

The term "hydrocarbon" as used herein describes a compound or substituent consisting exclusively of the elements carbon and hydrogen.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(-N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

"Arylalkyl" or "aralkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

"Inhibiting" includes both inhibiting and preventing the formation and agglomeration of hydrate crystals.

Unless otherwise indicated herein, "AA" means anti-agglomerant; "IPA" means isopropanol (isopropyl alcohol); "KHI" means kinetic hydrate inhibitor; "LDHI" means low-dosage hydrate inhibitor; "MeOH" means methanol; "NaCl" means sodium chloride; "PE" means pentaerythritol; and "THI" means thermodynamic hydrate inhibitor.

Having described the invention in detail, it will be apparent that modifications and variations are possible without departing from the scope of the invention defined in the appended claims.

EXAMPLES

The following non-limiting examples are provided to further illustrate the present invention.

Example 1: Rocking Cell Test

A Sapphire Rocking Cell RCS is commercially available from PSL Systemtechnik in Germany. The Sapphire Rocking Cell is a laboratory instrument used to test the performance of low dosage hydrate inhibitors. The compositions were evaluated based on their ability to effectively minimize the size of gas hydrate agglomerate particles and disperse those particles into the hydrocarbon phase. Chemical performance was evaluated by determining the maximum treatable water cut (water to oil ratio) and the minimum chemical dosage to register a pass in the rocking cell test.

A rocking cell has two parts, a manifold and a cell body. The manifold is made up of stainless steel fittings that are welded together. It has three stems. An inlet stem is used to charge gas into the cell. An outlet stem is used to release the gas out of the cell. The third stem connects to a transducer, which measures the pressure inside of the cell. The cell body has three layers. The outer layer is a polycarbonate tube, which has a thickness of 0.7 cm. The middle layer is made of stainless steel metal and is connected to the manifold. The inner layer is a high-pressure sapphire tube, which has an outer diameter of 2.8 cm, inner diameter of 1.85 cm, and length of 5 cm. This sapphire tube can handle up to 3000 psi. A stainless steel ball which has a diameter of 1.6 cm is located inside the sapphire tube to induce turbulence and mix fluids during the rocking process.

Test fluids usually contain three components. For the anti-agglomerate test, 7.2 mL of warm crude oil was first injected into the cell. Next, a solution of NaCl synthetic brine (10.3% by weight) was injected into the cell to make a 25% water cut mixture. The anti-agglomerate test composition was the final component injected into the cell. The dosage of the test composition was based on the volume of aqueous phase. The initial temperature was set to 21° C. Observations were made every two to three hours, before the rocking was stopped, and also immediately after the restart.

Each cell was charged with synthetic natural gas (SNG) and pressurized up to 2500 psi. All cells rocked for at least 0.5 hours until fluid was saturated and pressure stabilized. The rocking was ceased and the tank temperature was reduced to the set point of 4° C. over approximately 8 hours. The cells were continuously rebosted to a pressure of 2500 psi and remained static for 24 hours. Rocking was restarted for 1 hour with frequent observations to rank each cell with a ranked set of pass/fail criterion. Pressure and tank temperature data was recorded during this time.

An example of the gas hydrate-inhibiting composition is detailed in the following table. AA1 has the structure of:

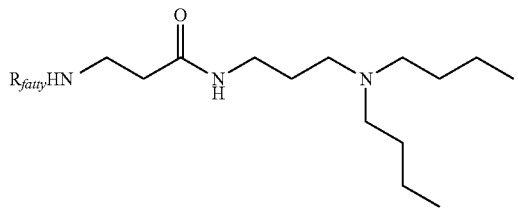

where $R_{fatty}$ is a coco group.

| Component | Percentage (wt/wt) |
| --- | --- |
| AA1 | 52.14 |
| Acetic acid | 7.26 |
| Methanol | 19.79 |
| Xylene | 19.79 |
| Capstone FS-3100 | 1.02 |

The minimum effective dose (MED) was the lowest dose of the anti-agglomerate in combination with the fluorine-containing agent that resulted in a pass for the rocking cell test.

| Example | Minimum Effective Dose Rate (vol %) |
| --- | --- |
| AA1 | 1.5 |
| AA1 with Poly(vinylidene-co-hexafluoro propylene) (350 ppm) | 0.63 |
| AA1 with Poly(vinylidene fluoride) (1800 ppm) | 0.63 |
| AA1 + Capstone FS3100 (0.5% wt/wt) | 0.63 |
| AA1 + Capstone FS22 (1% wt/wt) | 0.75 |
| AA1 + Capstone FS83 (1% wt/wt) | 0.75 |
| AA1 + Krytox 1525 | 0.50 |

The pass/fail criteria are based on the ability of the ball in the rocking cell to move within the sapphire tube. For example, the anti-agglomerant composition passes the rocking cell test if at the time of the ranking, the ball moves freely when the cell is rocked indicating that few agglomerates have formed. In contrast, the anti-agglomerant composition fails if the ball's movement is obstructed or completely stopped by the formation of gas hydrate agglomerates. The anti-agglomerate composition's performance is borderline when there are observable gas hydrate agglomerates and at least some of the agglomerates are stuck to the walls of the sapphire tube; when these agglomerates are present and the movement of the ball is not restricted, the anti-agglomerant composition ranking is a borderline pass.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing[s] shall be interpreted as illustrative and not in a limiting sense.

What is claimed is:

1. A method for inhibiting gas hydrate agglomeration in a fluid comprising a hydrocarbon and water, the method comprising adding to the fluid an effective amount of a gas hydrate-inhibiting composition, the composition comprising an anti-agglomerant agent and a fluorine-containing agent comprising a fluoroalkyl moiety, the hydrate-inhibiting composition inhibiting gas hydrate agglomeration in the fluid.

2. The method of claim 1, wherein the fluorine-containing agent is a perfluoropolyether, a perfluroalkylether, a perfluoropolyalkylether, a partially fluorinated betaine, a partially fluorinated amine oxide, a partially fluorinated non-ionic surfactant, a perfluroalkane, a partially fluorinated polybutylene, or a combination thereof.

3. The method of claim 1, wherein the fluorine-containing agent is a compound of formula 1 having the structure of:

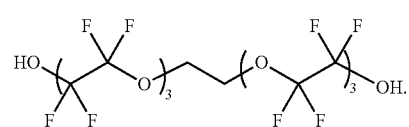

Formula 1

4. The method of claim 1, wherein the fluorine-containing agent is a compound of formula 2 having the structure of:

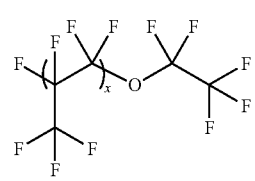

Formula 2 wherein x is an integer from 10 to 60.

5. The method of claim 1, wherein the fluorine-containing agent is a compound of formula 3 having the structure of:

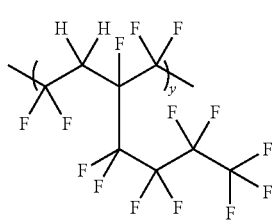

Formula 3 wherein y is an integer from 1 to 275.

6. The method of claim 1, wherein the fluorine-containing agent is a compound of formula 4 having the structure of:

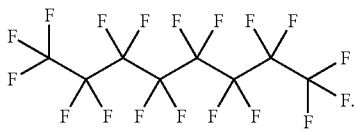

Formula 4

7. The method of claim 1, wherein the anti-agglomerant agent is an oxazolidinium compound; a quaternary ammonium compound with alkyl groups, alkoxylated alkyl groups, and fatty ester groups; tetrapropylene succinic acid-N,N-dibutylamino-N-ethyl ester; a quaternary ammonium compound with alkyl groups having alkoxy, amide, and ester substitution; a quaternary alkyl ammonium compounds; a quaternary ammonium, a quaternary phosphonium, a betaine, an amide, an amino alcohol, an ester, a sulphonium salt, or an amine oxide; an onium compound and amine salt; an amine compound having ether linkages; an alkoxylated diamine; an amine oxide salt; a zwitterionic quaternary ammonium compound; an ammonium or phosphonium alkylated hydrate; an alkylated ammonium, phosphonium, or sulphonium compound; a water-soluble alkoxide-based polymer or copolymer; an amino acid; a nonionic or anionic amphiphilic compound containing a polyol and a substituted or unsubstituted carboxylic acid; a hydroxycarbylamide; an organic amine and organic acid salt; a piperazine derivative; a quaternary ammonium substituted with an alkoxy group; an ion-pair amphiphilic complex; a rhamnolipid biosurfactant; a citric acid ester or citramide derivative; a quaternary amine having an amide group; a quaternary amine having an ester group; an ester quaternary ammonium compound; a reaction product of a polymerized unsaturated oil and an amino alcohol; an alkyl quaternary ammonium or phosphonium having alkoxylation; a quaternary sulphonium, phosphonium, ammonium salt combined with a corrosion inhibitor; an alkyl glycoside; an alkyl aryl sulphonic acid or an alkali metal or ammonium salt; a pyroglutamic acid ester; a tertiary amine salt; a quaternary ammonium polyoxyalkylene ester; a reaction product of a non-halide-containing inorganic acid, organic acid, or organic amine; a quaternary benzylammonium ion; a quaternary alkylammonium ion; a piperazinium amide/ester surfactant; an ammonium amide/ester surfactant; a cyclic ammonium amide/ester surfactant; or a combination thereof.

8. The method of claim 1, wherein the anti-agglomerant agent is an amide, a quaternary benzylammonium ion, a quaternary alkylammonium ion, piperazinium amide/ester surfactant, an ammonium amide/ester surfactant, a cyclic ammonium amide/ester surfactant, or a combination thereof.

9. The method of claim 8, wherein the anti-agglomerant agent is an amide, an ammonium amide/ester surfactant, a cyclic ammonium amide/ester surfactant, or a combination thereof.

10. The method of claim 1, wherein an effective amount of the fluorine-containing agent is from about 0.1 to about 2 wt. % based on the total weight of the produced water in the well system.

11. The method of claim 10, wherein the effective amount of the fluorine-containing agent is from about 0.5 to about 1.5 wt. %.

12. A method for inhibiting gas hydrate formation in a fluid comprising a hydrocarbon and water, the method comprising adding to the fluid an effective amount of a gas hydrate-inhibiting composition comprising a low dose hydrate inhibitor and a fluorine-containing agent, the gas hydrate-inhibiting composition inhibiting gas hydrate formation in the fluid, wherein the fluorine-containing agent comprises a fluoroalkyl moiety.

13. The method of claim 12, wherein the fluorine-containing agent is a perfluoropolyether, a perfluroalkylether, a perfluoropolyalkylether, a partially fluorinated betaine, a partially fluorinated amine oxide, a partially fluorinated non-ionic surfactant, a perfluroalkane, a partially fluorinated polybutylene, or a combination thereof.

14. The method of claim 12, wherein the fluorine-containing agent is a compound of formula 1 having the structure of:

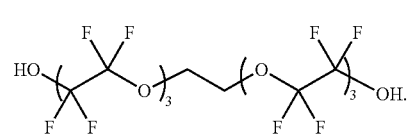

Formula 1

15. The method of claim 12, wherein the fluorine-containing agent is a compound of formula 2 having the structure of:

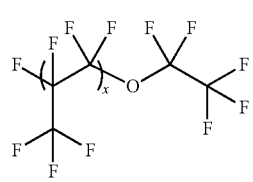

Formula 2 wherein x is an integer from 10 to 60.

16. The method of claim 12, wherein the fluorine-containing agent is a compound of formula 3 having the structure of:

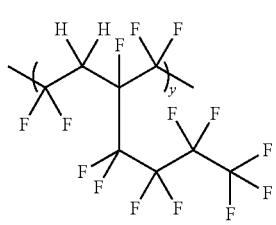

Formula 3 wherein y is an integer from 1 to 275.

17. The method claim 12, wherein the fluorine-containing agent is a compound of formula 4 having the structure of:

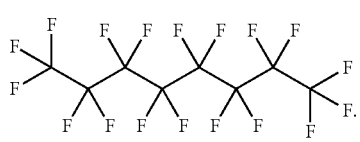

Formula 4

18. The method of claim 1, wherein the fluorine-containing agent comprises poly(vinylidene fluoride), poly(vinylidene-co-hexafluoro propylene), or a combination thereof.

19. The method of claim 12, wherein the fluorine-containing agent comprises poly(vinylidene fluoride), poly(vinylidene-co-hexafluoro propylene), or a combination thereof.

* * * * *

UNITED STATES PATENT AND TRADEMARK OFFICE
CERTIFICATE OF CORRECTION

PATENT NO. : 10,113,128 B2
APPLICATION NO. : 15/087237
DATED : October 30, 2018
INVENTOR(S) : Jeff Servesko and Rebecca Michele Lucente-Schultz Page 1 of 1

It is certified that error appears in the above-identified patent and that said Letters Patent is hereby corrected as shown below:

In the Claims

Column 12, Claim 2, Line 18:
"perfluroalkylether" should read "perfluoroalkylether"

Column 12, Claim 2, Line 21:
"perfluroalkane" should read "perfluoroalkane"

Column 14, Claim 13, Line 4:
"perfluroalkylether" should read "perfluoroalkylether"

Column 14, Claim 13, Line 7:
"perfluroalkane" should read "perfluoroalkane"

Column 14, Claim 17, Line 53:
After "The method" insert --of--

Signed and Sealed this
Twenty-sixth Day of February, 2019

Andrei Iancu
*Director of the United States Patent and Trademark Office*